US 11,521,440 B2

(12) United States Patent
Komada et al.

(10) Patent No.: US 11,521,440 B2
(45) Date of Patent: Dec. 6, 2022

(54) VEHICLE CONTROL DEVICE, EXHAUST GAS ANALYSIS SYSTEM, VEHICLE CONTROL PROGRAM, AND VEHICLE CONTROL METHOD FOR VEHICLE TESTS IN WHICH A VEHICLE IS CONTAINED IN A SOAK CHAMBER PRIOR TO TESTING

(71) Applicant: HORIBA, LTD., Kyoto (JP)

(72) Inventors: Mineyuki Komada, Kyoto (JP); Masashi Sakaguchi, Kyoto (JP); Mitsunobu Yamamoto, Kyoto (JP); Masahiro Yamaoka, Kyoto (JP)

(73) Assignee: HORIBA, LTD., Kyoto (JP)

( * ) Notice: Subject to any disclaimer, the term of this patent is extended or adjusted under 35 U.S.C. 154(b) by 188 days.

(21) Appl. No.: 16/692,203

(22) Filed: Nov. 22, 2019

(65) Prior Publication Data
US 2020/0168013 A1 May 28, 2020

(30) Foreign Application Priority Data

Nov. 22, 2018 (JP) .............................. JP2018-219450
Jan. 31, 2019 (JP) .............................. JP2019-015341

(51) Int. Cl.
*G07C 5/08* (2006.01)
*F01N 11/00* (2006.01)
(Continued)

(52) U.S. Cl.
CPC .......... *G07C 5/0841* (2013.01); *F01N 11/002* (2013.01); *G01K 1/022* (2013.01); *G01M 17/007* (2013.01); *F01N 2560/06* (2013.01)

(58) Field of Classification Search
CPC ...... Y02T 90/16; Y02T 90/167; G07C 5/0808; G07C 5/008; G07C 5/0816; G07C 5/0841;
(Continued)

(56) References Cited

U.S. PATENT DOCUMENTS

2017/0193422 A1* 7/2017 Frieden ............ G06Q 10/06311
2017/0228946 A1   8/2017 Tseng et al.
(Continued)

FOREIGN PATENT DOCUMENTS

| EP | 2950074 A1 | 12/2015 |
|---|---|---|
| JP | 2006-053023 A | 2/2006 |
| WO | 2006-031219 A1 | 3/2006 |

OTHER PUBLICATIONS

Giadoumis, Driving and Engine Cycles, 2017, p. 18 (Year: 2017).*
EESR dated Apr. 8, 2020 issued for European Patent Application No. 19 210 767.0, 9 pgs.

*Primary Examiner* — Eric S. McCall
*Assistant Examiner* — Timothy P Graves
(74) *Attorney, Agent, or Firm* — Brooks Kushman P.C.

(57) ABSTRACT

The present invention makes it possible to provide temperature traceability for a test vehicle. A vehicle control device controls temperature information for a test vehicle and includes a peripheral temperature acquisition unit that acquires a peripheral temperature of a test vehicle from a first temperature sensor that is provided in a soak chamber where the test vehicle is stored or in a test chamber where the test vehicle is tested, a position information acquisition unit that acquires position information for the test vehicle, and a recording unit that associates the peripheral temperature of the test vehicle with the position information for that test vehicle and records the association.

11 Claims, 6 Drawing Sheets

(51) Int. Cl.
*G01K 1/022* (2021.01)
*G01M 17/007* (2006.01)

(58) Field of Classification Search
CPC .............. G06Q 10/0833; G01D 21/02; F01N 2560/06; G01M 17/007; G01M 17/00
See application file for complete search history.

(56) References Cited

U.S. PATENT DOCUMENTS

2020/0043257 A1\* 2/2020 Venkiteswaran ...... G07C 5/008
2020/0160622 A1\* 5/2020 Aquila ............... G01R 31/3835

\* cited by examiner

VEHICLE CONTROL DEVICE, EXHAUST GAS ANALYSIS SYSTEM, VEHICLE CONTROL PROGRAM, AND VEHICLE CONTROL METHOD FOR VEHICLE TESTS IN WHICH A VEHICLE IS CONTAINED IN A SOAK CHAMBER PRIOR TO TESTING

CROSS-REFERENCE TO RELATED APPLICATION

This application claims priority to JP Application No. 2018-219450, filed Nov. 22, 2018 and JP Application No. 2019-015341, filed Jan. 31, 2019, the disclosures of which are incorporated in their entirety by reference herein.

TECHNICAL FIELD

The present invention relates to a control device and the like that control temperature information relating to a test vehicle.

TECHNICAL BACKGROUND

Conventionally, as is shown in Patent Document 1, a test vehicle that is subject to testing such as performance testing and the like is preliminarily housed in a chamber, known as a soak chamber, that has been adjusted to a predetermined temperature. For the test, the test vehicle is transported from there to a dynamometer or the like and the test is then conducted.

The temperature of this soak chamber is a factor that is capable of affecting results of a test such as, for example, an exhaust gas measurement. In addition, in the same way as the temperature of the soak chamber, the temperature of a testing chamber where the test vehicle undergoes testing, as well as various measurement values for the test vehicle in the soak chamber (such as, for example, temperature measurement values and the like relating to the test vehicle) are also factors that are capable of affecting test results.

DOCUMENTS OF THE PRIOR ART

Patent Documents

[Patent document 1] Japanese Unexamined Patent Application (JP-A) No. 2006-53023

DISCLOSURE OF THE INVENTION

Problems to be Solved by the Invention

For this reason, in recent years, in order to obtain precise test results, acquiring traceability of the temperature of a soak chamber, and of various measurement values for the test vehicle in the soak chamber (such as, for example, temperature measurement values relating to the test vehicle and the like) has been demanded. Therefore, it is a principal object of the present invention to construct a system that enables the temperature of a soak chamber as well as various measurement values for a test vehicle in that soak chamber to be gathered, and that enables traceability thereof to be acquired.

Means for Solving the Problem

Namely, a vehicle control device according to the present invention is a vehicle control device that controls temperature information for a test vehicle, and is provided with a peripheral temperature acquisition unit that acquires a peripheral temperature of the test vehicle from a first temperature sensor that is provided in a soak chamber where the test vehicle is housed or in a test chamber where the test vehicle is tested, a position information acquisition unit that acquires position information for the test vehicle, and a recording unit that associates the peripheral temperature of the test vehicle with the position information for that test vehicle and records the association.

According to a vehicle control device that is formed in this manner, because the peripheral temperature of the test vehicle is associated with the position information for that test vehicle and this association is recorded, it is possible to construct a system that provides temperature traceability for a test vehicle.

It is preferable that there be further provided a vehicle temperature acquisition unit that acquires from a second sensor that is mounted in the test vehicle a vehicle temperature that is the temperature of that particular test vehicle, and that the recording unit additionally associates the vehicle temperature of that test vehicle with the peripheral temperature of the test vehicle and the position information for the test vehicle, and records this association.

According to this type of structure, because the vehicle control device acquires not only the peripheral temperature of the test vehicle, but also the vehicle temperature of the test vehicle, it is possible to ascertain temperature differences and the like between these temperatures, and it is accordingly possible to not only provide temperature traceability for a test vehicle, but to also check whether or not a test vehicle has been adjusted to a predetermined temperature inside a soak chamber and the like.

It is preferable that one of a beacon transmitter that transmits beacon signals and a beacon receiver that receives beacon signals be provided in the soak chamber or in the test chamber, and that another one of the beacon transmitter and the beacon receiver be mounted in the test vehicle, and that the position information acquisition unit acquire position information for the test vehicle based on identification information contained in the beacon signal received by the beacon receiver.

According to this type of structure, it is possible correctly identify the soak chamber in which the test vehicle is being housed even if a plurality of soak chambers are provided.

It is preferable that a plurality of the first temperature sensors be provided in the soak chamber, and that the peripheral temperature acquisition unit acquire the peripheral temperature of the test vehicle from the first temperature sensor that is located closest to the test vehicle based on the position information for the test vehicle acquired by the position information acquisition unit.

According to this type of structure, even if the soak chamber is a very large one so that the temperature inside it varies from location to location, it is still possible to acquire an accurate peripheral temperature of a test vehicle.

It is preferable that the vehicle temperature acquisition unit acquire the vehicle temperature from the test vehicle that is parked in a parking lot, and that the position information acquisition unit acquire position information for the test vehicle from a global positioning satellite (GPS) system, and that the recording unit associate the vehicle temperature of the test vehicle parked in the parking lot with the position information acquired from the global positioning satellite coordinates for that test vehicle, and record this association.

According to this type of structure, it is possible to acquire not only the peripheral temperature of a test vehicle inside a chamber, but also the vehicle temperature of a test vehicle outside a chamber as temperature traceability factors for a test vehicle.

It is preferable that the recording unit additionally associate a residual charge of a battery that is mounted in the test vehicle with the peripheral temperature of that test vehicle and the position information for that test vehicle, and record the association.

According to this type of structure, it is possible to acquire not only the peripheral temperature of a test vehicle, but to also provide a wide range of traceability factors including a residual charge of a battery.

An exhaust gas analysis system according to the present invention is characterized in being provided with the above-described vehicle control device, a chassis dynamometer on which the test vehicle is mounted, and an exhaust gas analysis device that analyzes exhaust gas from the test vehicle.

In addition, a vehicle control program according to the present invention is a program that is used for vehicle control in which temperature information for a test vehicle is controlled, and is characterized in causing a computer to function as a peripheral temperature acquisition unit that acquires a peripheral temperature of the test vehicle from a first temperature sensor that is provided in a soak chamber where the test vehicle is housed or in a test chamber where the test vehicle is tested, a position information acquisition unit that acquires position information for the test vehicle, and a recording unit that associates the peripheral temperature of the test vehicle to the position information for that test vehicle and records this association.

Furthermore, a vehicle control method according to the present invention is a method of controlling temperature information for a test vehicle, and is characterized in that a peripheral temperature of the test vehicle is acquired from a first temperature sensor that is provided in a soak chamber where the test vehicle is housed or in a test chamber where the test vehicle is tested, position information for the test vehicle is acquired, and the peripheral temperature of the test vehicle is associated with the position information for that test vehicle and the result is then recorded.

According to this type of exhaust gas analysis system, vehicle control program, and vehicle control method, it is possible to achieve the same type of action and effects as those obtained from the above-described vehicle control device.

Effects of the Invention

According to the present invention having the above-described structure, it is possible to construct a system that provides temperature traceability for a test vehicle, and that additionally enables this temperature traceability to be recorded as data.

BEST EMBODIMENTS FOR IMPLEMENTING THE INVENTION

Hereinafter, an embodiment of an exhaust gas analysis system according to the present invention will be described with reference to the drawings.

Figure 1:
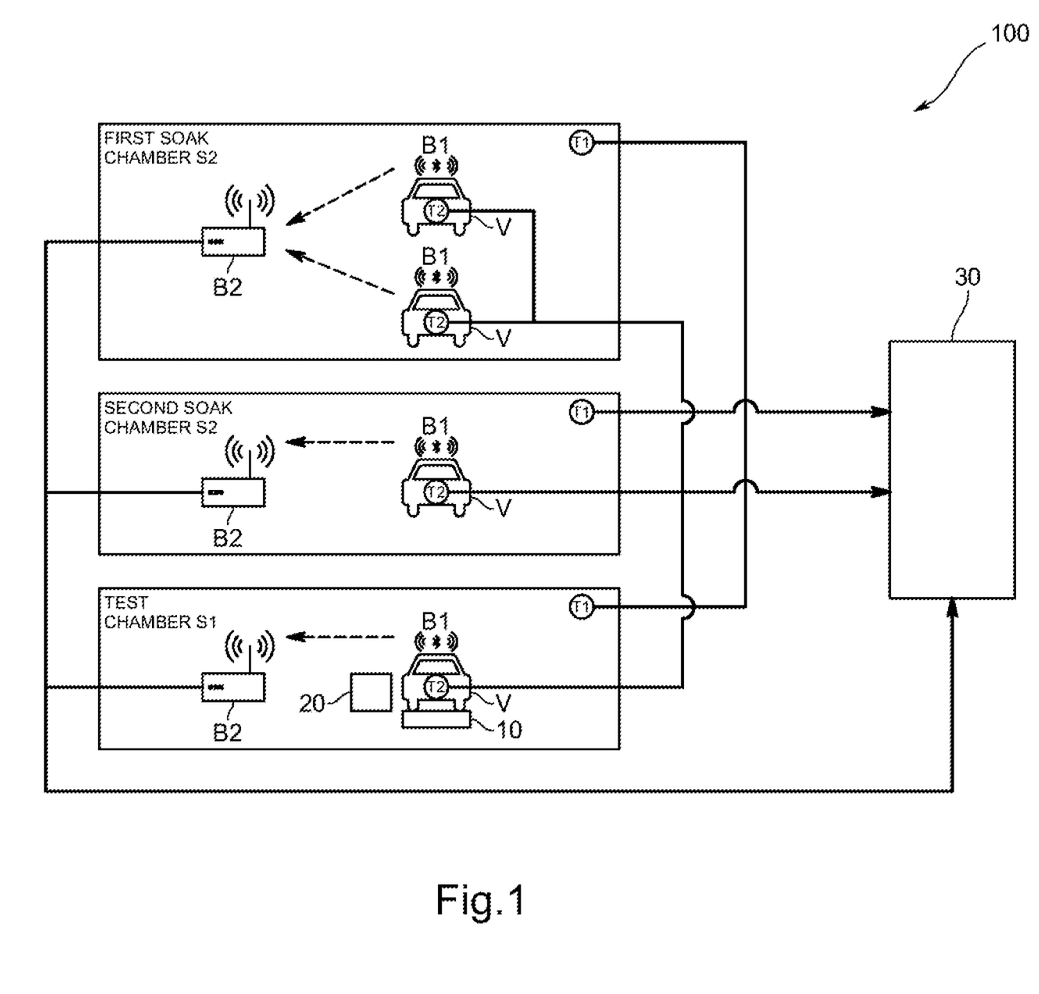
FIG. 1 is a schematic view showing a structure of an exhaust gas analysis system of the present embodiment.

As is shown in FIG. 1, an exhaust gas analysis system 100 of the present embodiment is provided with a test chamber S1, a chassis dynamometer 10, and an exhaust gas analysis device 20 and the like, and causes a test vehicle V to perform simulated driving on the chassis dynamometer 10, thereby enabling performances relating to fuel consumption, power consumption (i.e., the rate of power consumption of electric vehicles and the like), and exhaust gas components and the like to be tested. Note that the test chamber S1 is a chamber into whose interior the test vehicle V is transported, and where running tests are performed. The test chamber S is formed so as to be isolated from the outside, and can be set to various types of environments (i.e., temperatures and the like) in which measurements need to be made.

As is shown in FIG. 1, this exhaust gas analysis system 100 is further provided with soak chambers S2 in which test vehicles V are housed, and a vehicle control device 30 that controls temperature information relating to the test vehicles V.

The soak chambers S2 are chambers that are used to house either one or a plurality of the test vehicles V at least prior to these test vehicles V being tested. Note that when a plurality of the test vehicles V are being housed in the soak chambers S2, then these test vehicles V may be housed on a plurality of different floor levels or, alternatively, all of the test vehicles V may be housed on a single floor level.

The exhaust gas analysis system 100 of the present embodiment is provided with a plurality of soak chambers 2 (here, two chambers, namely, a first soak chamber and a second soak chamber). An air-conditioning mechanism (not shown in the drawings) that is used to adjust the chamber interior to a predetermined temperature, and a first temperature sensor T1 that detects the temperature inside the chamber are provided in each soak chamber S2. Additionally, a second temperature sensor T2 is mounted in either all of, or in a portion of the test vehicles V that are housed in the plurality of soak chambers S2.

Figure 2:
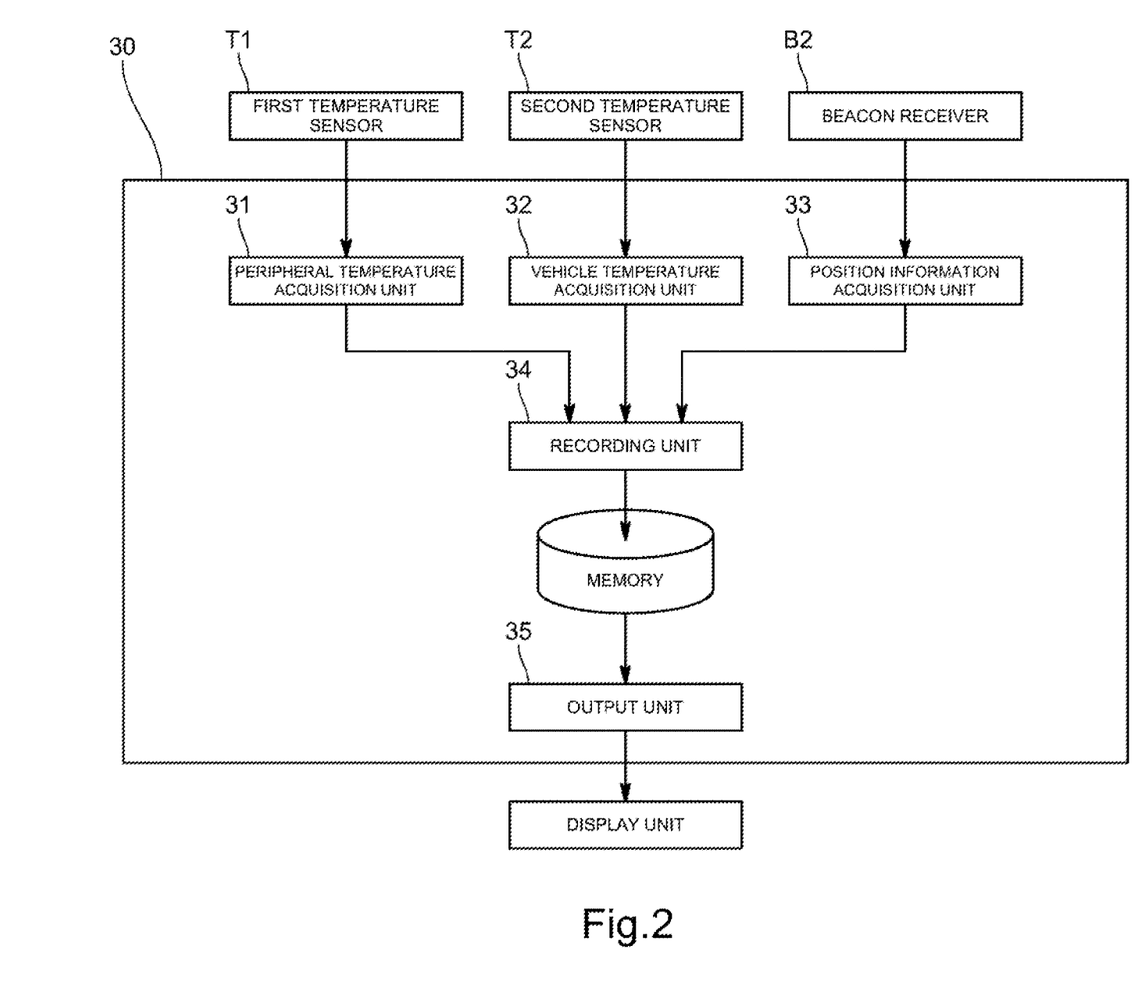
FIG. 2 is a function block diagram showing functions of a vehicle control device of the present embodiment.

The vehicle control device 30 is either a general purpose or a dedicated computer that is provided with a CPU, memory, a display unit, an input device (i.e., a keyboard and mouse and the like), and a communication interface and the like. As is shown in FIG. 2, this computer is made to perform the functions of at least a peripheral temperature acquisition unit 31, a vehicle temperature acquisition unit 32, a position information acquisition unit 33, and a recording unit 34 and the like as a result of the CPU and peripheral devices thereof and the like being operated in mutual collaboration in accordance with a vehicle control program stored in the memory. Note that the vehicle control device 30 may instead be a mobile terminal capable of being carried by a user such as, for example, a smartphone or a tablet computer or the like.

Hereinafter, a description of each unit will be given in conjunction with a description of operations of the vehicle control device 30.

The peripheral temperature acquisition unit 31 acquires temperatures detected by the first temperature sensors T1, together with chamber identifiers showing the soak chamber S2 in which the particular first temperature sensor T1 is provided, and acquires each temperature as being a peripheral temperature around the test vehicle V housed in the relevant soak chamber S2 (hereinafter, referred to as a 'peripheral temperature'). Note that communication between the peripheral temperature acquisition unit 31 and the first temperature sensors T1 may be achieved by using various communication networks such as, for example, wireless communication or a public telephone line or the like.

In the present embodiment, as is shown in FIG. 1, a first temperature sensor T1 is also provided in the test chamber S1 in which the test vehicle V is being tested. The peripheral temperature acquisition unit 31 acquires the temperature detected by the first temperature sensor T1 provided in the test chamber S1, together with a chamber identifier showing the relevant test chamber S1, and acquires this temperature as being the peripheral temperature around the test vehicle V that is being tested in the relevant test chamber S1.

The vehicle temperature acquisition unit 32 acquires temperatures detected by the second temperature sensors T2, together with a vehicle identifier showing the test vehicle V in which the relevant second temperature sensor T2 is mounted, and acquires each temperature as being a temperature of the relevant test vehicle V (hereinafter, referred to as a 'vehicle temperature'). Note that communication between the vehicle temperature acquisition unit 32 and the second temperature sensor T2 may be achieved by using various communication networks such as, for example, wireless communication or a public telephone line or the like.

The position information acquisition unit 33 acquires position information for the test vehicle V together with a vehicle identifier showing the relevant test vehicle V. Information specifying at least the position of the test vehicle V within the chamber is included in the position information. Here, chamber identifiers showing the soak chambers S2 and the test chamber S1 are used as the position information. Note that it is also possible for position information for the test vehicle V acquired via GPS to be used in addition to these chamber identifiers, or alternatively, to be used instead of these chamber identifiers.

As is shown in FIG. 1, in the present embodiment, a beacon transmitter B1 that transmits beacon signals is mounted in each test vehicle V, and beacon receivers B2 that receive these beacon signals are provided in the soak chambers S2 and the test chamber S1. Identification information that is used to identify the particular beacon transmitter B1 is included in the beacon signals, and this identification information is associated with the vehicle identifier of the vehicle in which that particular beacon transmitter B1 is mounted.

When a beacon receiver B2 receives a beacon signal, the position information acquisition unit 33 acquires from that beacon receiver B2 the vehicle identifier associated with the identification information included in the received beacon signal, and also acquires as position information the chamber identifier showing the soak chamber S2 or the test chamber S1 in which that beacon receiver B2 is provided. Note that communication between the position information acquisition unit 33 and the beacon receiver B2 may be achieved by using various types of wireless communication that employ, for example, a wireless LAN or the like.

The recording unit 34 associates a peripheral temperature of a test vehicle V with position information for that particular test vehicle V, and records this association in a predetermined area of its memory. Note that the recording unit 34 is not limited to recording in the memory provided in the vehicle control device 30, and may also record in external memory such as, for example, the Cloud, or USB memory, or an SD card or the like.

More specifically, the recording unit 34 compares the vehicle identifier that was acquired by the peripheral temperature acquisition unit 31 together with the peripheral temperature of the test vehicle V with the vehicle identifier that was acquired by the position information acquisition unit 33 together with the position information for the test vehicle V. If these vehicle identifiers match each other, the recording unit 34 associates that particular peripheral temperature with that particular position information, and records the association. Note that the recording unit 34 may additionally associate the vehicle identifiers of the test vehicle V with the peripheral temperature of the test vehicle V and the position information for the test vehicle V, and then record the resulting association in memory.

More specifically, the recording unit 34 associates, for example, time series data for the peripheral temperature with time series data for the position information, and records the resulting association. In this case, a mode in which time series data for the peripheral temperature and time series data for the position information are associated with each other in a time series is described. Consequently, each peripheral temperature is associated with the position information acquired by the position information acquisition unit 33 at the point in time when that particular peripheral temperature was acquired by the peripheral temperature acquisition unit 31, and the resulting association is then recorded. Note that, the recording unit 34 may additionally associate the time information for the points in time when these items of information were acquired with the peripheral temperature of the test vehicle V and the position information for the test vehicle V, and record the resulting association in memory.

The recording unit 34 of the present embodiment is formed so as to additionally associate the vehicle temperature acquired by the vehicle temperature acquisition unit 32 together with the vehicle identifier showing the particular test vehicle V with the peripheral temperature of the test vehicle V and the position information for the test vehicle V, and record the resulting association. Note that, in the event that the first temperature sensors T1 in the test chamber S1 and the soak chambers S2 stop functioning due to a malfunction or the like, then it is also possible for the recording unit 32 to mutually associate the vehicle temperature of the test vehicle V, the position information for that particular test vehicle V. and the vehicle identifier for that particular test vehicle V with each other, and record the resulting association.

More specifically, the recording unit 34 mutually associates time series data for the peripheral temperature, time series data for the position information, and time series data for the vehicle temperature with each other. Still more specifically, a mode in which, in the same way as in the mode described above, each of these sets of time series data are associated with each other in a time series is described. In this case, each peripheral temperature, the position information acquired by the position information acquisition unit 33 at the point in time when that particular peripheral temperature was acquired by the peripheral temperature acquisition unit 31, and the vehicle temperature acquired by the vehicle temperature acquisition unit 32 at that same point in time are associated with each other and recorded. In other words, the recording unit 34 associates these information items mutually with each other and records the result as a database.

The vehicle control device 30 in this case is provided with an output unit 35 that outputs at least the mutually associated peripheral temperature and position information in such a way that they can be compared. More specifically, the output unit 35 outputs the mutually associated peripheral temperature and position information to, for example, the display unit of the vehicle control device 30, or to a display unit of mobile terminal capable of being carried by a user such as, for example, a smartphone or a tablet computer that is separate from the vehicle control device 30 in such way that the peripheral temperature and position information can be compared. Here, the vehicle temperature that has also been associated with the peripheral temperature and position information is also output in such a way that it can be used to make comparisons.

Note that the output unit 35 may output the database recorded by the recording unit 34 as a list view, or may set the vehicle identifiers, position information, or time series information as keys, and enable the peripheral temperature or vehicle temperature or the like of the test vehicle V that are associated with these items to be extracted from the database. In addition, the output unit 35 is able to export the database recorded in the recording unit 34 to another server or the like via a wired or wireless communication device or external memory or the like.

According to the vehicle control device 30 that is formed in this manner, because the peripheral temperature of a test vehicle V and position information for that particular test vehicle are associated with each other and recorded, it is possible to construct an exhaust gas analysis system 100 that is able to provide temperature traceability for the test vehicle V.

Moreover, because the vehicle control device 30 acquires not only the peripheral temperature of the test vehicle V, but also the vehicle temperature of the test vehicle V, any temperature differences or the like between these can be ascertained, and not only is it possible to provide temperature traceability for the test vehicle V, but it is also possible to check whether a test vehicle V has been adjusted to a predetermined temperature and the like inside a soak chamber S2.

Note that the present invention is not limited to the above-described embodiment.

For example, in the above-described embodiment, a peripheral temperature of a test vehicle V, positional information thereof, and a vehicle temperature thereof are associated with each other and recorded, however, it is not essential for the vehicle temperature to be associated with the other information. In this case, it is not necessary for the second temperature sensor T2 to be provided in the test vehicle V, and neither is it necessary for the vehicle control device 30 to be provided with the functions of the vehicle temperature acquisition unit 32.

It is also possible for a plurality of the first temperature sensors T1 and a plurality of the beacon receivers B2 to be provided in the soak chambers S2.

In this embodiment, it is also possible for the position information acquisition unit 33 to be formed such that the beacon receiver B2 that receives a beacon signal transmitted from the beacon transmitter B1 mounted in a test vehicle V is specified from among a plurality of beacon receivers B2 provided in a soak chamber S2.

By employing this structure, the position information acquisition unit 33 is able to acquire the location where the specified beacon receiver B2 is installed within a soak chamber S2 as position information showing a more detailed position of the test vehicle V inside the soak chamber S2.

In this structure it is also possible to employ a mode in which the peripheral temperature acquisition unit 31 acquires, as the peripheral temperature of a test vehicle V, a temperature detected by the first temperature sensor T1 that is located closest to that test vehicle V based on the detailed position of the test vehicle V acquired by the position information acquisition unit 33.

If this type of structure is employed, then even if the soak chamber S2 is a very large one so that the temperature inside it varies from location to location, it is still possible to acquire an accurate peripheral temperature for a test vehicle V.

In addition, in the above-described embodiment, a case in which a beacon transmitter B1 is mounted in a test vehicle V, and a beacon receiver B2 is provided in a soak chamber S2 or a test chamber S1 is described, however, it is also possible for a beacon transmitter B1 to instead be provided in a soak chamber S2 or a test chamber S1, and for a beacon receiver B2 to be mounted in a test vehicle V.

Figure 3:
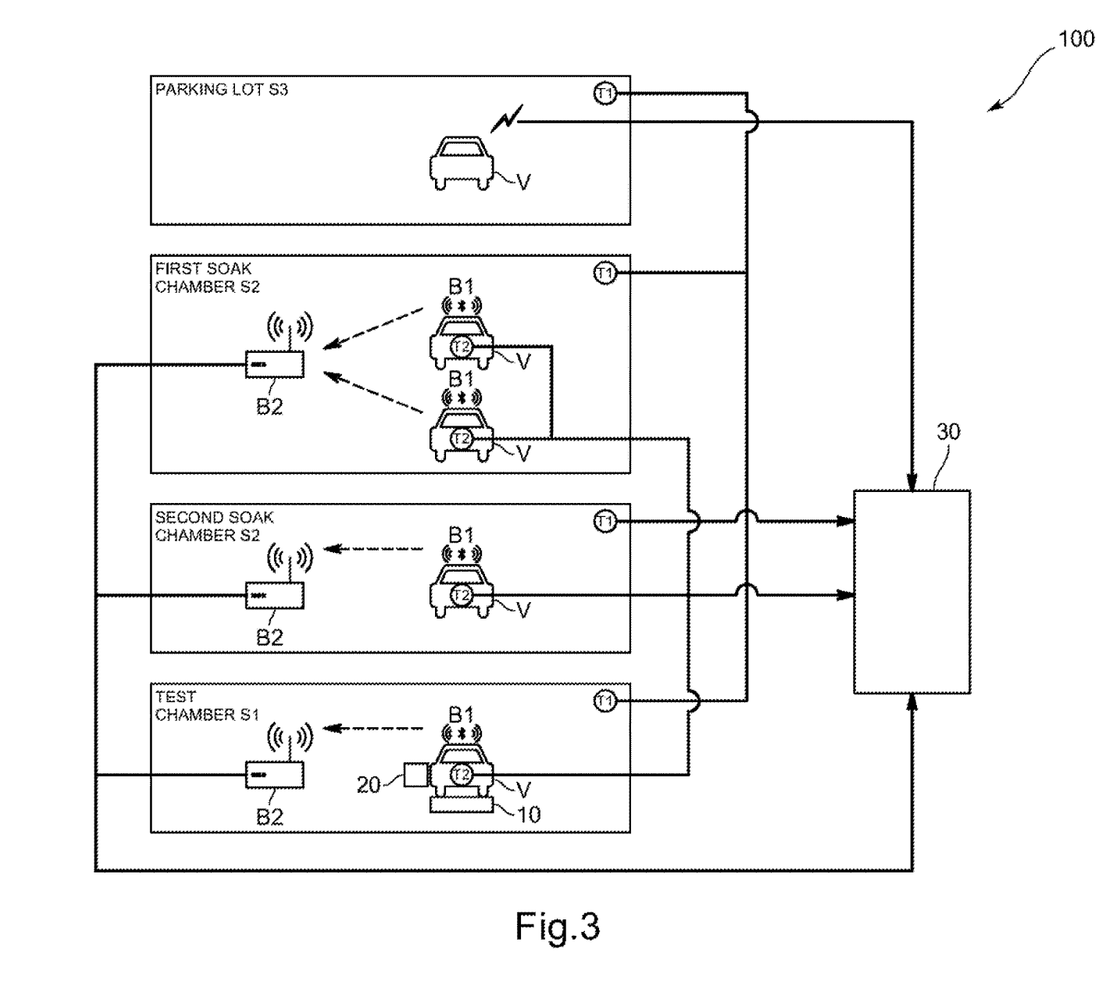
FIG. 3 is a schematic view showing information transfers by vehicle control devices in another embodiment.

Furthermore, as is shown in FIG. 3, it is also possible for a third temperature sensor T3 to be provided in, for example, an outdoor parking lot S3 in which a test vehicle V is parked.

In this case, the position information acquisition unit 33 may acquire position information for the test vehicle V from a GPS system.

In this structure, it is also possible for the recording unit 34 to acquire a peripheral temperature of a test vehicle V parked in a parking lot from the third temperature sensor T3, and to associate this peripheral temperature with the position information for this particular test vehicle V acquired from the GPS system, and record this association.

If this type of structure is employed, it is possible to acquire not only the peripheral temperature of a test vehicle V inside a chamber, but also the peripheral temperature of a test vehicle V outside a chamber as temperature traceability factors for a test vehicle V.

In addition to this, it is also possible for the vehicle temperature acquisition unit 32 to acquire a vehicle temperature from a test vehicle V parked in a parking lot.

In this case, the position information acquisition unit 33 is able to acquire position information for the test vehicle V from a GPS system.

In this structure, it is also possible for the recording unit 34 to associate the vehicle temperature for the test vehicle V parked in the parking lot with the position information for this particular test vehicle acquired from the GPS system, and record this association.

Note that, in this case, it is not necessary for the third temperature sensor T3 shown in FIG. 3 to be provided in the parking lot.

Figure 4:
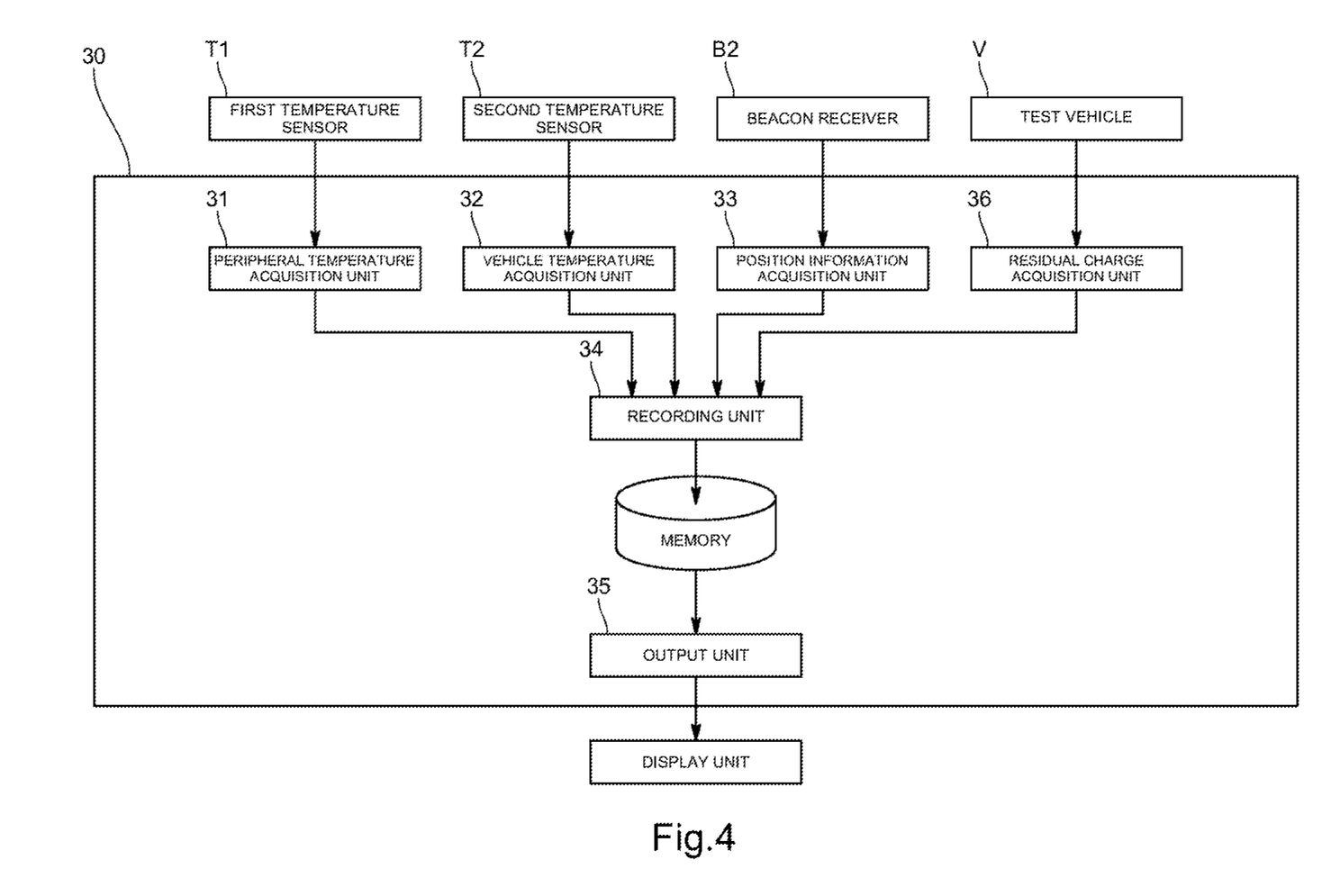
FIG. 4 is a schematic view showing information transfers by vehicle control devices in another embodiment.

In addition, as is shown in FIG. 4, it is also possible for the vehicle control unit 30 to be provided with a residual charge acquisition unit 36 that acquires a residual charge of a battery mounted in a test vehicle V, and for the recording unit 34 to also associate a residual charge acquired by the residual charge acquisition unit 36 with the peripheral temperature of the test vehicle V and the position information for that particular test vehicle V, and record this association.

Moreover, although not shown in the drawings, it is also possible for the vehicle control device 30 to be provided with an analysis results acquisition unit that acquires analysis results from the exhaust gas analysis device 20, and for the recording unit 34 to also associate analysis results acquired by the analysis results acquisition unit with the peripheral temperature of the test vehicle V and the position information for that particular test vehicle V.

If this type of structure is employed, it is possible to acquire not only the peripheral temperature of a test vehicle V, but to also provide a wide range of traceability factors including a residual charge of a battery and exhaust gas measurement results and the like.

Furthermore, it is also possible for the output unit 35 of the above-described embodiment to output a peripheral temperature of a test vehicle V detected by a first temperature sensor T1, and a vehicle temperature of the test vehicle V detected by a second temperature sensor T2 in such a way that these can be mutually compared with each other.

It is also possible for the vehicle control device 30 to be further provided with a function of an announcement unit that compares the peripheral temperature of the test vehicle V with the vehicle temperature of the test vehicle V, and when a temperature difference between these exceeds a predetermined threshold value, issues an announcement to that effect.

If this type of structure is employed, then it is possible, for example, to be made aware about a malfunction in the temperature control of the soak chamber S2 or the like.

Figure 5:
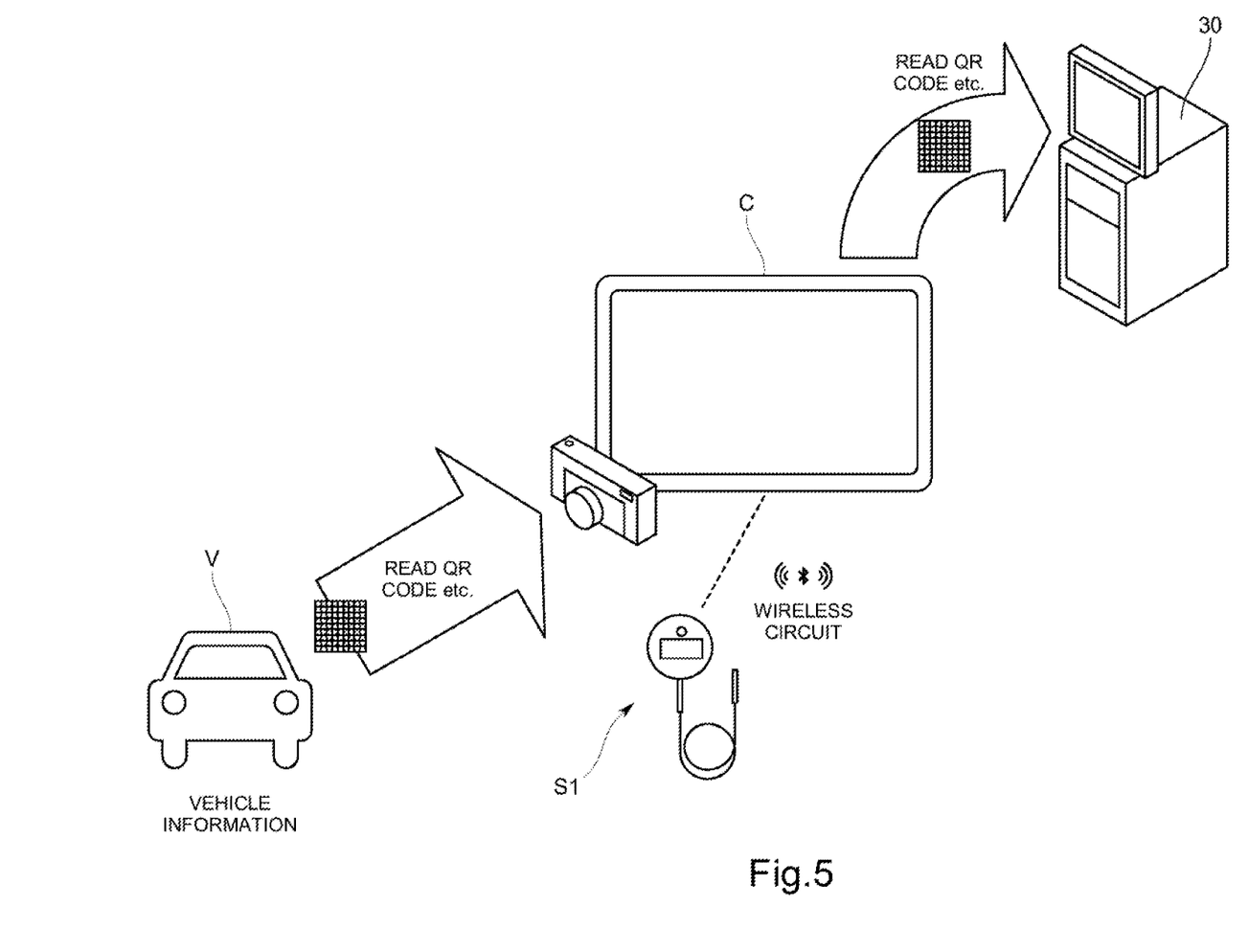
FIG. 5 is a schematic view showing a usage state of a vehicle control device in another embodiment.

Moreover, as is shown in FIG. 5, it is also possible for the vehicle control device 30 according to the present invention to be formed such that the vehicle control device 30 records a tire pressure of the test vehicle V.

More specifically, as is shown in FIG. 5, a structure may be employed in which the vehicle identifier for a test vehicle V may be acquired as a result of a barcode or a QR code or the like that is attached to that test vehicle V being read, for example, by a portable or desktop computer C. This vehicle identifier is then associated with results obtained when the tire pressure of that test vehicle V is measured, and this association is then recorded in the memory of the vehicle control device 30.

For example, when recording the tire pressure, the tire pressures of the front-right, front-left, rear-right, and rear-left tires of a test vehicle V may be measured using a tire pressure sensor S1, and tire pressure data showing the results from these measurements may then be transmitted via wireless communication to the computer C.

Figure 6:
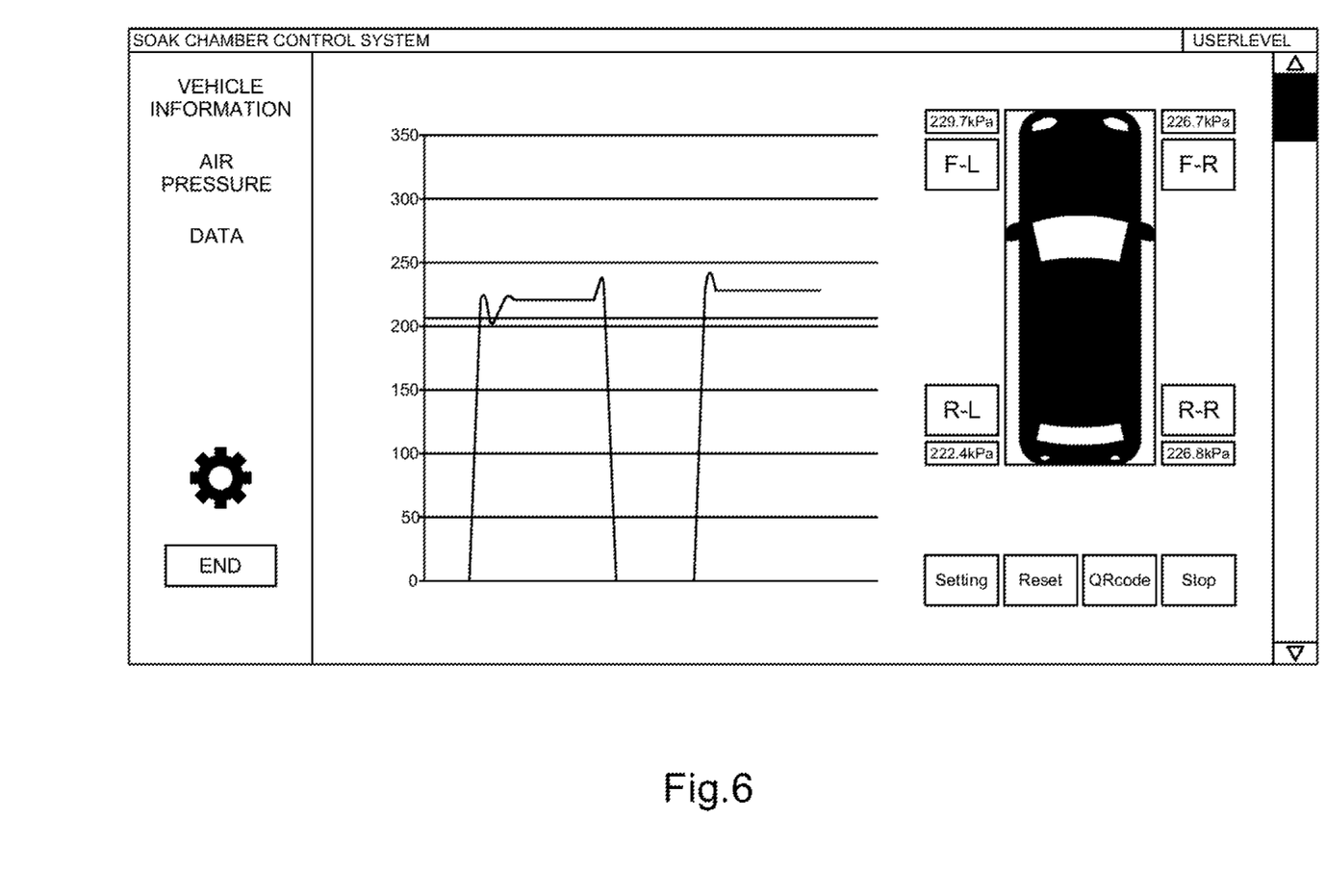
FIG. 6 is a schematic view showing a display screen of a computer in another embodiment.

At this time, for example, the measurement screen shown in FIG. 6 may be displayed on the display unit of the computer C. More specifically, measurement start buttons (F-L, F-R, R-L, R-R) which are used to measure the respective tire pressures of the front-right, front-left, rear-right, and rear-left tires are displayed at the front-right, front-left, rear-right, and rear-left portions of a vehicle symbol representing a test vehicle. When the measurement start button corresponding to the tire to be measured is pressed so that the tire pressure of that tire is measured by the tire pressure sensor S1, the resulting measurement value is transmitted to the computer C, and that same measurement value is also displayed in a graph on the display unit of the computer C. The computer C then confirms this measurement value as being tire pressure data, and displays the tire pressure data, for example, in a measurement result display area that has been set adjacent to the measurement start button. The tire pressure data of each tire measured in this way is then associated with the vehicle identifier, and is output to, and controlled by the vehicle control device 30. More specifically, the tire pressure data and the vehicle identifier for the test vehicle V are output to the vehicle control device 30, and the recording unit 34 then associates these with each other and stores this association in a predetermined area of its memory. Note that the date and time of the tire pressure measurement, and position information for the test vehicle V when the tire pressure was measured may also be associated with the tire pressure data and the vehicle identifier, and controlled.

Note also that an example of a method of controlling the above-described tire pressure data using the vehicle control device 30 is a method in which such data is output to the vehicle control device 30 as a result of, for example, a barcode or a QR code or the like that is displayed on the display unit of a portable computer C being read by a reading instrument provided in the vehicle control device 30. It is also possible to employ a method in which the various types of data are output to the vehicle control device 30 via wired or wireless communication.

Furthermore, it is also possible for the vehicle control device 30 of the present invention 30 to associate fuel information relating to fuel with which a test vehicle V was replenished with the vehicle identifier for that test vehicle V, and control this fuel information. More specifically, fuel information showing the type of fuel and/or the quantity of replenished fuel, and the vehicle identifier for the test vehicle V are output to the vehicle control device 30, and the recording unit 34 then associates these with each other and stores this association in a predetermined area of its memory. Note that the date and time when the test vehicle V was replenished with fuel, and position information for the test vehicle V may also be associated with the fuel information and the vehicle identifier, and controlled. Note also that the fuel information may be acquired, for example, by reading a barcode or a QR code or the like provided on a fuel replenishing facility, or on a fuel container or the like.

Moreover, when the test vehicle V is an electric vehicle or a hybrid vehicle, then it is also possible for the vehicle control device 30 of the present invention 30 to associate charge data showing a residual charge of a battery (i.e., an SOC: State Of Charge) of a test vehicle V with the vehicle identifier for that test vehicle V, and control this charge data. More specifically, charge data and the vehicle identifier for the test vehicle V are output to the vehicle control device 30, and the recording unit 34 then associates these with each other and stores this association in a predetermined area of its memory. Note that the date and time when the test vehicle V was charged, and position information for the test vehicle V may also be associated with the charge data and the vehicle identifier, and controlled.

Furthermore, it is also possible for the vehicle control device 30 to associate vehicle weight data showing the weight of a test vehicle V with the vehicle identifier for that test vehicle V, and control this vehicle weight data. More specifically, vehicle weight data and the vehicle identifier are output to the vehicle control device 30, and the recording unit 34 associates these with each other and stores this association in a predetermined area of its memory. Note that the date and time when the vehicle weight was measured, and position information for the test vehicle V whose vehicle weight was measured may also be associated with the vehicle weight data and the vehicle identifier, and controlled.

Furthermore, it should be understood that the present invention is not limited to the above-described embodiment, and that various modifications and the like may be made thereto insofar as they do not depart from the spirit or scope of the present invention.

DESCRIPTION OF THE REFERENCE NUMERALS

100 . . . Exhaust Gas Analysis System
V . . . Test Vehicle
S1 . . . Test Chamber
10 . . . Chassis Dynamometer
20 . . . Exhaust Gas Analysis Device
S2 . . . Soak Chamber
T1 . . . First Temperature Sensor
T2 . . . Second Temperature Sensor
B1 . . . Beacon Transmitter
B2 . . . Beacon Receiver
30 . . . Vehicle Control Device
31 . . . Peripheral Temperature Acquisition Unit
32 . . . Vehicle Temperature Acquisition Unit
33 . . . Position Information Acquisition Unit
34 . . . Recording Unit

What is claimed is:

1. A vehicle control device that controls temperature information for a test vehicle, comprising:
    a peripheral temperature acquisition unit configured to acquire a peripheral temperature of the test vehicle from a first temperature sensor that is provided outside of the test vehicle in a soak chamber where the test vehicle is stored or in a test chamber where the test vehicle is tested;
    a position information acquisition unit configured to acquire multiple pieces of position information for the test vehicle, while the test vehicle is in a parked state, including a chamber identifier that identifies whether the test vehicle is located in the soak chamber or the test chamber; and
    a recording unit configured to associate the peripheral temperature of the test vehicle with each of the multiple pieces of position information for the test vehicle in the parked state, and record the association.

2. The vehicle control device according to claim 1 further comprising a vehicle temperature acquisition unit configured to acquire from a second sensor that is mounted in the test vehicle a vehicle temperature that is a temperature of the test vehicle, wherein
    the recording unit is configured to associate the vehicle temperature of the test vehicle with the peripheral temperature of the test vehicle and the position information for the test vehicle, and record the association.

3. The vehicle control device according to claim 1 further comprising a transmitter configured to transmit signals and a receiver configured to receive signals, wherein
    one of the transmitter and receiver is provided in the soak chamber or in the test chamber, and the other of the transmitter and receiver is mounted in the test vehicle, and
    the position information acquisition unit is configured to acquire the multiple pieces of position information for the test vehicle based on identification information contained in the signals received by the receiver.

4. The vehicle control device according to claim 1, wherein
    a plurality of the first temperature sensors are provided in the soak chamber, and
    the peripheral temperature acquisition unit is configured to acquire the peripheral temperature of the test vehicle from the first temperature sensor that is located closest to the test vehicle based on the multiple pieces of position information for the test vehicle acquired by the position information acquisition unit.

5. The vehicle control device according to claim 2, wherein
    the vehicle temperature acquisition unit is configured to acquire the vehicle temperature from the test vehicle that is parked in a parking lot,
    the position information acquisition unit is configured to acquire at least some of the multiple pieces of position information for the test vehicle while the test vehicle is parked from a global positioning satellite system, and
    the recording unit is configured to associate the vehicle temperature of the test vehicle parked in the parking lot with the at least some of the multiple pieces of position information acquired from the global positioning satellite coordinates for the test vehicle, and record the association.

6. The vehicle control device according to claim 1, wherein the recording unit is configured to associate a residual charge of a battery that is mounted in the test vehicle with the peripheral temperature of the test vehicle and the multiple pieces of position information for the test vehicle, and record the association.

7. The vehicle control device according to claim 1, wherein the recording unit is configured to associate fuel data relating to fuel with which the test vehicle is replenished with the peripheral temperature of the test vehicle and the multiple pieces of position information for the test vehicle, and record the association.

8. The vehicle control device according to claim 1, wherein the recording unit is configured to associate tire pressure data showing tire pressures of the test vehicle with the peripheral temperature of the test vehicle and the multiple pieces of position information for the test vehicle, and record the association.

9. An exhaust gas analysis system comprising:
    the vehicle control device according to claim 1;
    a chassis dynamometer on which the test vehicle is mounted; and
    an exhaust gas analysis device configured to analyze exhaust gas from the test vehicle.

10. A tangible, non-transitory computer readable medium storing a vehicle control program that is used for vehicle control in which temperature information for a test vehicle is controlled, and that causes a computer to function as:
    a peripheral temperature acquisition unit configured to acquire a peripheral temperature of the test vehicle from a first temperature sensor that is provided outside of the test vehicle in a soak chamber where the test vehicle is stored or in a test chamber where the test vehicle is tested;
    a position information acquisition unit configured to acquire multiple pieces of position information for the test vehicle, while the test vehicle is in a parked state, including a chamber identifier that identifies whether the test vehicle is located in the soak chamber or the test chamber; and
    a recording unit configured to associate the peripheral temperature of the test vehicle with each of the multiple pieces of position information for the test vehicle in the parked state, and record the association.

11. A vehicle control method that is used for controlling temperature information for a test vehicle, the method comprising:
    acquiring a peripheral temperature of the test vehicle from a first temperature sensor that is provided outside of the test vehicle in a soak chamber where the test vehicle is stored or in a test chamber where the test vehicle is tested;

acquiring multiple pieces of position information for the test vehicle in a parked state including a chamber identifier that identifies whether the test vehicle is located in the soak chamber or the test chamber; and
associating the peripheral temperature of the test vehicle with each of the multiple pieces of position information for the test vehicle, and recording the association.

* * * * *